United States Patent
Eckel et al.

(10) Patent No.: US 11,286,327 B2
(45) Date of Patent: Mar. 29, 2022

(54) FR COMPOSITE COMPOSITION FOR LIGHT-BASED ADDITIVE MANUFACTURING

(71) Applicant: The Boeing Company, Chicago, IL (US)

(72) Inventors: Zak Eckel, Thousand Oaks, CA (US); Phuong Bui, Thousand Oaks, CA (US); Mark O'Masta, Oak Park, CA (US); Jacob Hundley, Thousand Oaks, CA (US); Tony Koung, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 334 days.

(21) Appl. No.: 16/704,704

(22) Filed: Dec. 5, 2019

(65) Prior Publication Data

US 2021/0171697 A1    Jun. 10, 2021

(51) Int. Cl.

| | |
|---|---|
| *C08G 8/10* | (2006.01) |
| *C08K 5/07* | (2006.01) |
| *C08K 5/5397* | (2006.01) |
| *C08K 5/00* | (2006.01) |
| *C08K 5/14* | (2006.01) |
| *C08G 73/06* | (2006.01) |
| *C08K 5/46* | (2006.01) |
| *B33Y 10/00* | (2015.01) |
| *B33Y 70/00* | (2020.01) |
| *B33Y 80/00* | (2015.01) |

(52) U.S. Cl.
CPC ........... *C08G 8/10* (2013.01); *C08G 73/0644* (2013.01); *C08K 5/0066* (2013.01); *C08K 5/07* (2013.01); *C08K 5/14* (2013.01); *C08K 5/46* (2013.01); *C08K 5/5397* (2013.01); *B33Y 10/00* (2014.12); *B33Y 70/00* (2014.12); *B33Y 80/00* (2014.12); *C08K 2201/005* (2013.01)

(58) Field of Classification Search
CPC .......... C08G 8/10; B33Y 10/00; B33Y 70/00; B33Y 80/00; B28B 1/001; C09D 181/00; C09K 21/00
USPC ........................................................ 524/358
See application file for complete search history.

(56) References Cited

U.S. PATENT DOCUMENTS

| | | |
|---|---|---|
| 4,575,330 A | 3/1986 | Hull |
| 6,174,943 B1 | 1/2001 | Matsumoto et al. |
| 6,255,371 B1 | 7/2001 | Schlosser et al. |
| 6,642,284 B2 | 11/2003 | Thewes et al. |
| 6,900,269 B2 | 5/2005 | Hwang et al. |
| 7,382,959 B1 | 6/2008 | Jacobsen |
| 7,960,445 B2 | 6/2011 | Jacobine et al. |
| 8,470,916 B2 | 6/2013 | Glauner et al. |
| 10,407,550 B2 | 9/2019 | Yang et al. |
| 2006/0068194 A1 | 3/2006 | Feldstein |
| 2010/0080920 A1 | 4/2010 | Lagrange et al. |
| 2014/0106979 A1 | 4/2014 | Lau et al. |
| 2016/0046769 A1* | 2/2016 | Yang ................ C08G 75/00 427/508 |
| 2018/0148585 A1* | 5/2018 | Eckel ..................... C09D 7/68 |

FOREIGN PATENT DOCUMENTS

EP    0 629 665 A2    12/1994

OTHER PUBLICATIONS

Saha et al., "Facile and General Preparation of Multifunctional Main-Chain Cationic Polymers through Application of Robust, Efficient, and Orthogonal Click Chemistries," Journal of the American Chemical Society, 2012, 134, 17291-17297.

* cited by examiner

*Primary Examiner* — Doris L Lee
(74) *Attorney, Agent, or Firm* — MH2 Technology Law Group LLP

(57) ABSTRACT

A fire retardant (FR) composite composition, including a liquid polymer, wherein the liquid polymer includes a photopolymer including at least two of a first molecule, a second molecule, and a third molecule, a FR thermoset, and a photoinitiator.

19 Claims, No Drawings

FR COMPOSITE COMPOSITION FOR LIGHT-BASED ADDITIVE MANUFACTURING

TECHNICAL FIELD

The present disclosure generally relates to resin and polymer compositions for creating composite structures with desirable fire retardant properties, and more particularly, to resin and polymer compositions suitable for light-based additive manufacturing for creating fire retardant (FR) composite structures.

BACKGROUND

Many industries, such as the aerospace, automotive, and marine industries, require the use of lightweight but structurally strong structural materials, such as polymer composites. With interior structures and outer mold line aircraft structures, significant mass, labor and cost savings, and moreover, performance benefits, can be achieved by using open cellular designs and topologically optimized components that can be 3D-printed to reduce weight and increase efficiency. 3D printing also offers a way to reduce the overhead cost of supplying repair services as expensive and large tooling required to fabricate repair components can be eliminated and the storage of spares can be reduced.

However, safety requirements also demand the use of materials configured to reduce fire hazards and/or have minimum fire retardant (FR) properties. Accordingly, polymer composites with fire or flame retardant properties are used in a wide variety of applications to reduce fire hazards and/or meet fire safety regulations.

Additive Manufacturing (AM) methods allow for the rapid and customizable fabrication of three-dimensional objects, usually by adding material layer by layer. The term AM encompasses many technologies including subsets like 3D Printing, Rapid Prototyping (RP), Direct Digital Manufacturing (DDM), layered manufacturing, and additive fabrication.

Generally, light-based additive manufacturing methods use light or laser exposure to cure layer-upon-layer of a photopolymer (i.e. a polymer that changes properties when exposed to light) to create a composite structure. Examples of light-based additive manufacturing include, but are not limited to, stereo lithography (SLA), digital light projection (DLP), material jetting (MJ), and self-propagating waveguide (SPPW) process. However, many photopolymer compositions suitable for light-based additive manufacturing may lack the FR properties required for many applications.

Accordingly, there is a need for polymer compositions suitable for light-based additive manufacturing to create composite structures and objects with desirable FR properties.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a fire retardant (FR) composite composition, including from about 15.0 weight % to about 99.9 weight % of a liquid polymer, based on a total weight of the FR composite composition, wherein the liquid polymer includes from about 10.0 weight % to about 90.0 weight % of a photopolymer including at least two of a first molecule, a second molecule, and a third molecule, based on a total weight of the liquid polymer, from about 15.0 weight % to about 80.0 weight % of a FR thermoset, based on the total weight of the liquid polymer, and from about 0.001 weight % to about 10 weight % of a photoinitiator, based on the total weight of the liquid polymer, and wherein the first molecule includes one or more unsaturated carbon-carbon double bonds or triple bonds, wherein the second molecule includes a terminal thiol group, and wherein the third molecule includes one or more functional groups selected from the group consisting of an aliphatic ether, a cyclic ether, a vinyl ether, an epoxy, a cyclo aliphatic epoxy, an oxetane, an isocyanate, and a diisocyanate group.

The FR composite composition may further include from about 15.0 weight % to about 80.0 weight % of a solid filler, wherein the solid filler includes at least one of an inert, a nonflammable, and a flame retarding material.

The photopolymer may include from about 5.0 weight % to about 90 weight % of the first molecule, based on a total weight of the photopolymer.

The first molecule may include at least one of tris (2-hydroxyethyl) isocyanurate triacrylate, 1,3,5-trivinyl-1,3,5-trimethylcyclosiloxane, 1,3,5,7-tetravinyl-1,3,5,7 tetra methylcyclo tetrasiloxane, vinylmethylsiloxane-dimethylsiloxane copolymer, 1,3,5-triallyl-1,3,5-triazine-2,4,6(1H,3H, 5H)-trione, bis[2-(methacryloyloxy)ethyl] phosphate, bisphenol A epoxy diacrylate, (acryloxypropyl)methylsiloxane, pentaerythritol tetraacrylate, pentaerythritol triacrylate, trimethylolpropane triacrylate, ethylene, substituted olefins, halogenated olefins, 1,3-dienes, styrene, x-methyl styrene, vinyl esters, acrylonitriles, acrylamides, N-vinyl carbazole, N-vinyl pyrolidone, monoacrylates, diacrylates, triacrylates, tetraacrylates, pentaacrylates, monomethacrylates, dimethacrylates, trimethacrylates, tetramethacrylates, pentamethacrylates, pentabromobenzyl acrylate, pentabromobenzyl methacrylate, 2-isocyanatoethyl acrylate, 2-isocyanatoethyl methacrylate, and mixtures and combinations thereof.

The first molecule may include at least one of organic phosphates, phosphinates, and phosphonates.

The first molecule may include a brominated compound.

The photopolymer may include from about 1.0 weight % to about 90 weight % of the second molecule, based on a total weight of the photopolymer.

The second molecule may include at least one of 1,4-butanedithiol, benzene-1,4-dithiol, biphenyl-4,4-dithiol, 4,4'-thiobisbenzenethiol, pentaerythritol tetrakis(3-mercaptopropionate), trimethylolpropanetris(2-mercaptoacetate), trimethylolpropane tris(3-mercaptopropionate), tetrakis(dimethyl-2-mercaptoacetate siloxy)silane, (mercaptopropyl) methylsiloxane-dimethylsiloxane copolymer, (mercaptopropyl)methylsiloxane homopolymer, and pentaerythritol tetrakis(2-mercaptoacetate), ethylene glycol bis(3-mercaptopropionate), 1,4-butanediol bis(thioglycolate), 2-[2,4-bis (2-mercaptoethyl) cyclohexyl]ethanethiol, 2-[3,5-bis(2-mercaptoethyl)cyclohexyl]ethanethiol and mixtures and combinations thereof.

The photopolymer may include from about 1.0 weight % to about 80.0 weight % of the third molecule, based on a total weight of the photopolymer.

The third molecule may include at least one of epoxy functional dimethylpolysiloxane, (epoxycyclohexylethyl)

methylsiloxane-dimethylsiloxane copolymer, bis (3,4-epoxycyclohexylmethyl) adipate, 3,4-epoxycyclohexylmethyl-3',4'-epoxycyclohexane carboxylate, 3-ethyl-3-hydroxymethyl oxetane, and mixtures and combinations thereof.

The FR thermoset may include at least one of resole phenolics, novolac phenolics, cyanate esters, melamines, polycyanurates, and mixtures and combinations thereof.

The FR thermoset may include aromatic backbones and is configured to crosslink with formaldehydes.

The FR thermoset may include at least one of novolac, bisphenol A, bisphenol B, bisphenol F, resorcinol, 2,4,6-triamino-1,3,5-triazine, 2,4-Diamino-6-phenyl-1,3,5-triazine, 6-Methyl-1,3,5-triazine-2,4-diamine, methylolmelamines, hexamethylolmelamine, hexaallylmelamine, and mixtures and combinations thereof.

The photoinitiator may include at least one of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, and mixtures and combinations thereof.

The solid filler may have an average particle size from about 5 nm to about 100 micrometers.

The solid filler may include at least one of silica, alumina trihydrate, ammonium polyphosphate, red phosphorous, organic phosphinate, melamine polyphosphate, borates, expandable graphite, and mixtures and combinations thereof.

The FR composite composition may further include at least one of a thermal crosslinking agent; a cationic photoinitiator; a hydrogen donor; a UV sensitizer; a free radical inhibitor; a thermal initiator; a UV absorbers; a fluorescent; a dye; an optical brightener; an additional flame retardant; a rheology modifier; and a dispersion agent.

The FR composite composition may have an UL-94 Rating of V-2 or better.

The FR composite composition may have an UL-94 Rating of V-0.

The FR composite composition may have a total heat release (THR) of about 12 KJ/g or less.

The FR composite composition may have a total heat release (THR) of about 10 KJ/g or less.

The FR composite composition may have an UL-94 Rating of V-2 or better and a total heat release (THR) of about 12 KJ/g or less The FR composite composition has an UL-94 Rating of V-0 and a total heat release (THR) of about 8 KJ/g or less The FR composite composition may be configured to create an FR composite by a light-based additive process.

The light-based additive process may include a self-propagating waveguide (SPPW) process, and the FR composite composition may be configured to form a plurality of self-propagating polymer optical waveguides.

The light-based additive process may include a light based stereo lithography 3D printing process, and the FR composite composition may be polymerized when exposed to light in layers of patterns that render a 3D structure upon completion.

The foregoing and/or other aspects and utilities embodied in the present disclosure may also be achieved by providing an FR composite created from an FR composite composition including from about 15.0 weight % to about 99.9 weight % of a liquid polymer, based on a total weight of the FR composite composition, wherein the liquid polymer includes from about 10.0 weight % to about 90.0 weight % of a photopolymer including at least two of a first molecule, a second molecule, and a third molecule, based on a total weight of the liquid polymer, from about 15.0 weight % to about 80.0 weight % of a FR thermoset, based on the total weight of the liquid polymer, and from about 0.001 weight % to about 10 weight % of a photoinitiator, based on the total weight of the liquid polymer, and wherein the first molecule includes one or more unsaturated carbon-carbon double bonds or triple bonds, wherein the second molecule includes a terminal thiol group, and wherein the third molecule includes one or more functional groups selected from the group consisting of an aliphatic ether, a cyclic ether, a vinyl ether, an epoxy, a cyclo aliphatic epoxy, an oxetane, an isocyanate, and a diisocyanate group.

The foregoing and/or other aspects and utilities embodied in the present disclosure may also be achieved by providing a method of creating an FR composite, including using an FR composite composition including from about 15.0 weight % to about 99.9 weight % of a liquid polymer, based on a total weight of the FR composite composition, wherein the liquid polymer includes from about 10.0 weight % to about 90.0 weight % of a photopolymer including at least two of a first molecule, a second molecule, and a third molecule, based on a total weight of the liquid polymer, from about 15.0 weight % to about 80.0 weight % of a FR thermoset, based on the total weight of the liquid polymer, and from about 0.001 weight % to about 10 weight % of a photoinitiator, based on the total weight of the liquid polymer, and wherein the first molecule includes one or more unsaturated carbon-carbon double bonds or triple bonds, wherein the second molecule includes a terminal thiol group, and wherein the third molecule includes one or more functional groups selected from the group consisting of an aliphatic ether, a cyclic ether, a vinyl ether, an epoxy, a cyclo aliphatic epoxy, an oxetane, an isocyanate, and a diisocyanate group to create an FR composite.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Reference will now be made in detail to exemplary implementations of the present teachings.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith.

As used herein, "free" or "substantially free" of a material or substance may refer to when the material is present in an amount small enough to have zero or negligible effects on a desired result.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The inventors have created novel resin and polymer compositions usable for creating composite structures with desirable fire retardant properties, which are suitable for light-based additive manufacturing.

In particular, a fire retardant (FR) composite composition, may include a liquid polymer and a solid filler.

The FR composite composition may include from about 15.0 weight % to about 99.9 weight % of the liquid polymer, based on a total weight of the FR composite composition. For example, the FR composite composition may include from about 20.0 weight % to about 85.0 weight % or from about 40.0 weight % to about 65.0 weight % of the liquid polymer, based on the total weight of the FR composite composition.

The FR composite composition may include from about 15.0 weight % to about 80.0 weight % of the solid filler, based on a total weight of the FR composite composition. For example, the FR composite composition may include from about 20.0 weight % to about 70.0 weight % of the solid filler and from about 35.0 weight % to about 60.0 weight % of the solid filler, based on the total weight of the FR composite composition.

In some implementations, the amount of solid filler may vary according to the envisioned AD method. For example, the FR composite composition may include from about 10 weight % to about 35 weight % solid filler for SPPW processes; the FR composite composition may include from about 25.0 weight % to about 55.0 weight % solid filler for SLA or DLP processes; and from about 50.0 weight % to about 80.0 weight % solid filler for MJ or other AM processes.

The liquid polymer includes a photopolymer, an FR thermoset, and a photoinitiator.

The liquid polymer may include from about 10.0 weight % to about 90.0 weight % of the photopolymer, based on a total weight of the liquid polymer. For example, the liquid polymer may include from about 20.0 weight % to about 85.0 weight % or from about 45.0 weight % to about 75.0 weight % of the photopolymer, based on the total weight of the liquid polymer.

In some implementations, the amount of photopolymer may vary according to the envisioned AD method. For example, the liquid polymer may include from about 75.0 weight % to about 90.0 weight % photopolymer for SPPW processes; the liquid polymer may include from about 35.0 weight % to about 75.0 weight % photopolymer for SLA or DLP processes; and from about 20.0 weight % to about 50.0 weight % photopolymer for MJ or other AM processes.

The liquid polymer may include from about 15.0 weight % to about 80.0 weight % of the FR thermoset, based on a total weight of the liquid polymer. For example, the liquid polymer may include from about 15.0 weight % to about 65.0 weight % or from about 25.0 weight % to about 55.0 weight % of the FR thermoset, based on the total weight of the liquid polymer.

The liquid polymer may include from about 0.001 weight % to about 10.0 weight % of the photoinitiator, based on a total weight of the liquid polymer. For example, the liquid polymer may include from about 0.001 weight % to about 5.0 weight % or from about 0.001 weight % to about 2.0 weight % of the photoinitiator, based on the total weight of the liquid polymer.

As used herein, the term "photopolymer" refers to a light-activated polymer that changes its properties when exposed to light. Photopolymers may be configured to react to light in the ultraviolet (UV) or in visible regions of the electromagnetic spectrum. That is, the photopolymer may include one or more multifunctional monomers and oligomers that can polymerize in the presence of light in order to achieve the desired physical properties. For example, the photopolymer may harden due to cross-linking of molecules (monomers and/or oligomers) forming the photopolymer when exposed to light (induced polymerization by light).

The polymerization of the photopolymer may be initiated internally or externally via photoinitiators or a combination thereof.

Accordingly, the photopolymer may include one or more molecules or molecule types, each molecule including one or more monomers and/or oligomers with an associated function or physical characteristic. For example, the photopolymer may include at least two of a first molecule, a second molecule, and a third molecule.

For example, the photopolymer may include a first molecule, the first molecule including one or more monomers and/or oligomers having a carbon-carbon bond. The first molecule may include one or more unsaturated carbon-carbon double bonds or triple bonds. In some implementations, the first molecule includes a carbon-carbon bond and a flame-retarding compound.

Substitution on the unsaturated bonds may be with any atoms, such as hydrogen (H), fluorine (F), and chlorine (Cl), and/or groups, such as alkyl groups, esters, amine groups, hydroxyl groups and carbon-nitrogen groups (CN). The first molecule may include different combinations of these different unsaturated bonds. Of these different unsaturated bonds, the most common ones are the C=C double bonds at the terminal position of the molecules (e.g., three substitutions on the C=C bonds are hydrogen atoms). Examples of these groups may include allyl, vinyl, ethynyl, vinyl ether, vinyl ester, vinyl amides, vinyl triazine, vinyl isocyanurate, isocyanate, acrylate, methacrylate, diene, triene, and mixtures thereof.

The first molecule may also include at least one non-carbon atom in the main chain or side chains. For example, the non-carbon atoms that may be used include, but are not limited to, silicon (Si), oxygen (O), nitrogen (N), bromine (Br), and phosphorus (P). The non-carbon atoms may be part of cyclic or acyclic groups or structures. For example, the first molecule may include at least one of tris (2-hydroxyethyl) isocyanurate triacrylate, 1,3,5-trivinyl-1,3,5-trimethylcyclosiloxane, 1,3,5,7-tetravinyl-1,3,5,7 tetra methylcyclo tetrasiloxane, vinylmethylsiloxane-dimethylsiloxane copolymer, 1,3,5-triallyl-1,3,5-triazine-2,4,6(1H,3H,5H)-trione, bis[2-(methacryloyloxy)ethyl] phosphate, bisphenol A epoxy diacrylate, (acryloxypropyl)methylsiloxane, pentaerythritol tetraacrylate, pentaerythritol triacrylate, trimethylolpropane triacrylate, ethylene, substituted olefins, halogenated olefins, 1,3-dienes, styrene, x-methyl styrene, vinyl esters, acrylonitriles, acrylamides, N-vinyl carbazole, N-vinyl pyrolidone, monoacrylates, diacrylates, triacrylates, tetraacrylates, pentaacrylates, monomethacrylates, dimethacrylates, trimethacrylates, tetramethacrylates, pentamethacrylates, pentabromobenzyl acrylate, pentabromobenzyl methacrylate, 2-isocyanatoethyl acrylate, 2-isocyanatoethyl methacrylate, and mixtures and combinations thereof.

The first molecule may also include flame-retarding compounds, such as organic phosphates, phosphinates, and phosphonates and/or organic compounds with phosphate, phosphinates, and phosphonates groups. As illustrated below, the R1, R2, and R3 group can be compounds of C1-C12 hydrocarbons. In some implementations, at least two of the R1, R2, and R3 groups include UV reactive functional groups. The UV reactive functional groups may be terminally unsaturated bonds, such as allyl, vinyl, ethynyl, vinyl ether, vinyl ester, vinyl amides, vinyl triazine, vinyl isocyanurate, isocyanate, acrylate, methacrylate, diene, triene, and mixtures and combinations thereof.

Accordingly, in some implementations, the first molecule may have a backbone containing phosphorus and/or the first molecule may include at least one of organic phosphates, phosphinates, and phosphonates. For example, the first molecule may include Bis[2-(methacryloyloxy)ethyl] phosphate and/or trisacryloyloxyethyl phosphate.

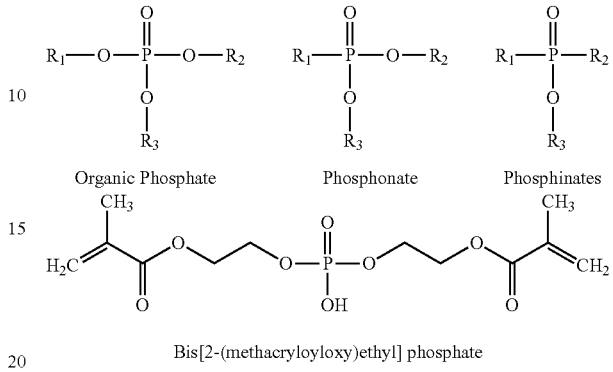

Bis[2-(methacryloyloxy)ethyl] phosphate

The first molecule may include a brominated compound, such as pentabromobenzyl methacrylate and/or pentabromobenzyl acrylate.

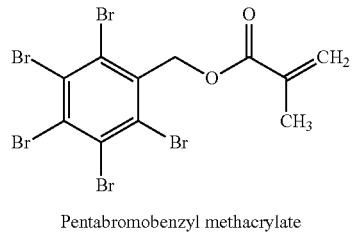 [SMILES: C=C(C)C(=O)OCc1c(Br)c(Br)c(Br)c(Br)c1Br]

Pentabromobenzyl methacrylate

The photopolymer may include from about 5 weight % to about 90 weight % of the first molecule, based on a total weight of the photopolymer. For example, the photopolymer may include from about 5.0 weight % to about 90 weight % of monomers and/or oligomers under the first molecule type. In some implementations, the photopolymer may include from about 15.0 weight % to about 80.0 weight % of the first molecule, or from about 35.0 weight % to about 65.0 weight % of the first molecule, based on a total weight of the photopolymer.

The photopolymer may include a second molecule including a terminal thiol group. For example, the photopolymer may include a second molecule including one or more monomers and/or oligomers including a terminal thiol group. The second molecule may have a structure with a thiol or mercapto group of the form R—S—H, where R is an alkyl or other organic substituent. The R—S—H molecule may contain one or more sulfur-hydrogen (SH) groups in the structure that can be used in the polymerization of the photopolymer.

The alkyl or other organic substituent may include organic groups, such as alkyl groups, esters, amines, and hydroxyl, or inorganic non-carbon containing atoms or groups. For example, the inorganic non-carbon atoms or groups may include Si, O, N, Br, and P. The non-carbon atoms or groups may be part of cyclic or acyclic groups or structures.

Accordingly, the second molecule may include at least one of 1,4-butanedithiol, benzene-1,4-dithiol, biphenyl-4,4-dithiol, 4,4'-thiobisbenzenethiol, pentaerythritol tetrakis(3-mercaptopropionate), trimethylolpropanetris(2-mercaptoacetate), trimethylolpropane tris(3-mercaptopropionate), tetrakis(dimethyl-2-mercaptoacetate siloxy)silane, (mercaptopropyl)methylsiloxane-dimethylsiloxane copolymer, (mercaptopropyl)methylsiloxane homopolymer, and pentaerythritol tetrakis(2-mercaptoacetate), ethylene glycol bis (3-mercaptopropionate), 1,4-butanediol bis(thioglycolate), 2-[2,4-bis(2-mercaptoethyl) cyclohexyl]ethanethiol, 2-[3,5-bis(2-mercaptoethyl)cyclohexyl]ethanethiol, and mixtures and combinations thereof.

The photopolymer may include from about 1.0 weight % to about 90.0 weight % of the second molecule, based on a total weight of the photopolymer. That is, the photopolymer may include from about 1.0 weight % to about 90.0 weight % of monomers and/or oligomers under the second molecule type. For example, the photopolymer may include from about 1.0 weight % to about 50.0 weight % or from about 5.0 weight % to about 25.0 weight % of the second molecule, based on a total weight of the photopolymer.

The photopolymer may include a third molecule, the third molecule including one or more functional groups selected from the group consisting of aliphatic ether, cyclic ether, vinyl ether, an epoxy, cyclo aliphatic epoxy, and oxetane group. For example, the third molecule may include one or more monomers and/or oligomers including one or more functional groups selected from the group consisting of aliphatic ether, cyclic ether, vinyl ether, an epoxy, cyclo aliphatic epoxy, and oxetane groups.

In some implementations, the third molecule includes one or more monomers and/or oligomers including one or more functional groups selected from the group consisting of cyclo aliphatic epoxy and oxetane groups.

The third molecule may also include at least one non-carbon atom in a main chain or side chains. For example, the non-carbon atoms may include Si, O, N, Br, and P. The non-carbon atoms may be part of cyclic or acyclic groups or structures.

Accordingly, the third molecule may include at least one of epoxy functional dimethylpolysiloxane, (epoxycyclohexylethyl)methylsiloxane-dimethylsiloxane copolymer, bis (3,4-epoxycyclohexylmethyl) adipate, 3,4-epoxycyclohexylmethyl-3',4'-epoxycyclohexane carboxylate, 3-ethyl-3-hydroxymethyl oxetane, and mixtures and combinations thereof.

The photopolymer may include from about 1.0 weight % to about 80.0 weight % of the third molecule, based on a total weight of the photopolymer. That is, the photopolymer may include from about 1.0 weight % to about 80.0 weight % of monomers and/or oligomers under the third molecule type. For example, the photopolymer may include from about 1.0 weight % to about 50.0 weight % or from about 1.0 weight % to about 25.0 weight % of the third molecule, based on a total weight of the photopolymer.

The liquid polymer includes an FR thermoset. As used herein, the term "thermoset" or "thermosetting polymer" refers to a heat-activated polymer that changes its properties when exposed to heat or a suitable radiation. That is, a thermoset may include one or more multifunctional monomers and oligomers that can polymerize in the presence of heat or suitable radiation to crosslink and form a thermoset material. For example, a thermoset may irreversibly harden into a plastic due to crosslinking of molecules (monomers and/or oligomers) forming the thermoset when exposed to heat. The polymerization of the thermoset may be promoted by high pressure or the use of a catalyst or thermal cross-linking agent.

The FR thermoset may be configured to have improved or inherent fire retardant properties. For example, the FR thermoset may be high char forming when heated up to 800° C. and/or the FR thermoset may have a low heat release when heated up to 800° C. For example, when tested under a thermogravimetric analysis (TGA), a char formation of the FR thermoset may plateau to about 30.0% or above when heated up to 800°. In other implementations, the char formation of the FR thermoset may plateau to about 50.0% or above when heated to 800° C.

The FR thermoset may include at least one of resole phenolics, novolac phenolics, cyanate esters, melamines, polycyanurates, and mixtures and combinations thereof. The FR thermoset may include aromatic backbones and may be configured to crosslink with formaldehydes.

Resole phenolics may include least one of phenolic novolacs (varying molecular weight), bisphenol A, bisphenol B, bisphenol F, and resorcinol.

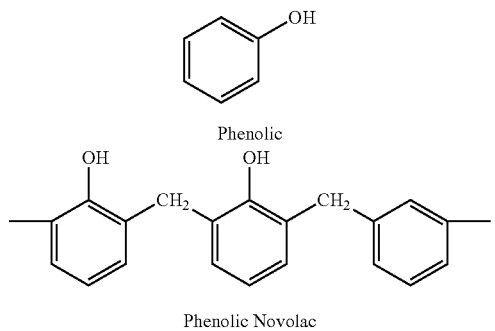

Phenolic

Phenolic Novolac

Cyanate ester may include cyanate ester resins which cyclo trimerize the cyanate ester group to form an aryloxy-triazine ring. The cyanate ester group may have a chemical formula of R—O—C≡N where R includes saturated and/or unsaturated aliphatic and/or aromatic hydrocarbon chains. For example a cyanate ester may include 2,2-bis(4cyanatophenyl)propane, 1,1-bis(4cyanatophenyl)ethane, bis(3,5-dimethyl-4-cyantophenyl)methane, bis(4cyanatophenyl)thioether, 1,3-bis(4cyanatophenyl-1methylethylidene))benzene.

The FR thermoset may also include aromatic nitrogen heterocyclic compounds, such as melamine resins, which crosslink with formaldehyde to form a thermoset network. Suitable examples of melamine resins may include melamine, heptazine, N2-(4,6-diamino-1,3,5-triazin-2-yl)-1,3,5-triazine-2,4,6-triamine) (melam), 1,3,4,6,7,9,9b-heptaazaphenalene-2,5,8-triamine (melem), 2,4,6-tris(cyanoamino)-1,3,5-triazine (melon).

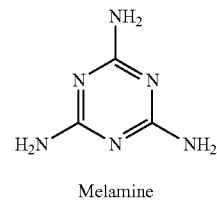

Melamine

Accordingly, in some implementations, the FR thermoset includes at least one of novolac, bisphenol A, bisphenol B, bisphenol F, resorcinol, 2,4,6-triamino-1,3,5-triazine, 2,4-Diamino-6-phenyl-1,3,5-triazine, 6-Methyl-1,3,5-triazine-2,4-diamine, methylolmelamines, hexamethylolmelamine, hexaallylmelamine, and mixtures and combinations thereof.

The liquid polymer includes a photoinitiator. As used herein, the term "photoinitiator" refers to a molecule that creates reactive species (free radicals, cations or anions) when exposed to radiation (UV or visible). For example, the photoinitiator may generate free radicals under a light exposure by one of intramolecular bond cleavage or intermolecular hydrogen abstraction from a light having a wavelength from about 200 nm to about 500 nm.

The photoinitiator may include one or more photoinitiators. For example, the photoinitiator may include different types of photoinitiators resulting in different reaction rates during polymerization of the liquid polymer. The photoinitiator may include different types of photoinitiators to allow multi-wavelength curing of the liquid polymer.

The photoinitiator may include at least one of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, and mixtures and combinations thereof.

The FR composite composition may include a solid filler.

The solid filler may be configured to improve a strength of the FR composite composition. For example, the solid filler may be configured to increase intrinsic and/or extrinsic toughening mechanisms of the FR composite composition, such as crack tip deflection. The solid filler may also improve an impact resistance, toughness, and modulus of the FR composite composition or of a resulting FR composite.

The solid filler may be configured to lower a heat release of the FR composite composition. The solid filler may be configured to improve flame retardation properties of the FR composite composition and/or of a FR composite created using the FR composite composition. The solid filler may include at least one of an inert filler material or an FR filler material. For example, in some implementations, the solid filler is inert. In other implementations, the solid filler may be non-flammable and/or the solid filler may be flame retarding. Accordingly, the solid filler may be inherently flame retardant. In other implementations, the solid filler includes at least one of inert materials, nonflammable materials, and/or flame retarding materials.

The solid filler may be a particulate. For example, the solid filler may be comprised of a plurality of particles. The solid filler may have an average particle size from about 5 nm to about 100 μm. In some implementations, the average particle size of the solid filler enhances its ability to be suspended and/or well dispersed in the FR composite composition and/or makes the FR composite composition more uniform. In other implementations, the average particle size of the solid filler enhances allows it to be more transparent and/or ease the transmission of light through the FR composite composition.

The solid filler may include silica, alumina trihydrate, ammonium polyphosphate, red phosphorous, organic phosphinate, melamine polyphosphate, borates, expandable graphite, and mixtures and combinations thereof.

The solid filler may be introduced into the FR composite composition in a dry powder form. The solid filler may be introduced into the FR composite composition in a solvent that is later evaporated out, such as, acetone, toluene, isopropanol, and ethylacetate, or in a suspension of photomonomers or thermoset resins. The solid filler may be dispersed in the FR composite composition via mechanical mixing.

The solid filler may be configured to enhance a transmission of radiation (UV or visible) through the FR composite composition. For example, the solid filler may be UV transparent. In other implementations, the solid filler may allow and/or enhance the transmission of light having a wavelength from about 200 nm to about 500 nm.

The solid filler may be surface treated. For example, the solid filler may be surface treated to enhance an incorporation of the solid filler in the FR composite composition and/or with the liquid polymer. The solid filler may also be surface treated to promote adhesion with the liquid polymer, the solid filler may be surface treated to enhance a dispersion of the solid filler in the FR composite composition and/or in the liquid polymer, and the solid filler may be surface treated to prevent agglomeration of the solid filler particles within the FR composite composition and/or the liquid polymer.

The solid filler may be surface treated by adding surface modifiers. For example, surface modifiers may be added to a surface of the solid filler particles. In one implementation, the solid filler may include one or more surfactants. The surfactants may have components that bind to the surface of the solid filler particles and components that solvate in the liquid polymer In other implementations, surface modification functionality may be added to the surface of the solid filler particles by covalently bonding a functionality to the surface of the solid filler particles. For example, silane surface modifiers may be used that include active groups that can react with the chemistry of the liquid polymer and/or increase a wettability and/or dispersability of the solid filler particles. Examples of suitable silane surface modifiers include mercapto trimethoxy silane, vinyl trimethoxy silane, 3-glycidyl oxypropyl trimethoxy silane, and mixtures and combinations thereof.

The solid filler may also be surface treated through other chemical means, such as vapor solid reactions or liquid solid reactions, such as oxidation in a furnace or acid treatment.

In some implementations, the solid filler may be treated to enhance additive manufacturing or 3D printing of the FR composite composition. For example, the solid filler may be coated or surface treated with a chemical including a functional group that aids in polymerization or crosslinking with the liquid polymer upon UV and/or thermal exposure. Said functional groups may include unsaturated ethers, vinyls, acrylates, methacrylates, and cyclic ethers (epoxy, oxetanes, amines, hydroxyls, isocyanates, hydrides). In some implementations, these functional groups may be used to thermally cure the FR composite composition after an initial UV curing during 3D printing.

The FR composite composition may include one or more additional ingredients to enhance properties of the FR composite composition. For example, the FR composite composition may include one or more of thermal crosslinking agents, cationic photoinitiators or photo acid generators, hydrogen donors, UV sensitizers, free radical inhibitors or antioxidants, free radical thermal initiators, UV absorbers, additional flame retardants, rheology modifiers, and dispersion additives or agents.

The FR composite composition may include one or more thermal crosslinking agents configured to initiate, catalyze, and/or accelerate a crosslinking of the FR thermoset. The thermal crosslinking agent may include common acids and bases, such as hydroxides, amines, and isocyanates. For example, the thermal crosslinking agents may include hexamethylenetetramine, formaldehyde, sulfuric acid, hydrochloric acid, nitric acid, sodium hydroxide, potassium hydroxide, lithium hydroxide, magnesium hydroxide, barium hydroxide, calcium hydroxide, tetraalkyl ammonium hydroxides, and mixtures or combinations thereof.

The FR composite composition may include from about 0.0 weight % to about 10.0 weight % thermal crosslinking agents, based on a total weight of the FR composite composition. For example, the FR composite composition may include 10.0 weight % or less, 5.0 weight % or less, or 1.0 weight % or less thermal crosslinking agents, based on a total weight of the FR composite composition.

The FR composite composition may include one or more cationic photoinitiators or photo acid generators, such as sulphonium, iodonium, and ferrocenium cation paired with a non-nucleophilic anion.

While not bound to any particular theory, it is believed that said salts under light exposure create Brønsted acids under light exposure by cleavage of the sulphonium, iodonium, and/or ferrocenium cation of the onium salt, paired with a proton donor.

In some implementations, the cationic photoinitiators are active under a light having a wavelength from about 200 nm to about 500 nm. For example, the cationic photoinitiators may be active under a light having a wavelength from about 200 nm to about 350 nm.

The cationic photoinitiators may include sulfonium and iodonium and ferrocenium salts, cyclopentacienylcumene-iron hexafluoro phosphate, diphenyliodonium phosphate, triarylsulfonium hexafluoroantimonate, and mixtures or combinations thereof.

The FR composite composition may include from about 0.0 weight % to about 10.0 weight % cationic photoinitiators, based on a total weight of the FR composite composition. For example, the FR composite composition may include 10.0 weight % or less, 5.0 weight % or less, or 3.0 weight % or less cationic photoinitiators, based on a total weight of the FR composite composition.

The FR composite composition may include one or more hydrogen donors. The hydrogen donors may be used to assist in the generation of a Brønsted acid in the cationic or in acceleration of anionic photo initiator reactions.

The hydrogen donors may include alcohols, ethers, esters, water, tertiary amines, and mixtures or combinations thereof. The hydrogen donors may also include metal hydrides.

The FR composite composition may include from about 0.0 weight % to about 10.0 weight % hydrogen donors, based on a total weight of the FR composite composition. For example, the FR composite composition may include 10.0 weight % or less, 5.0 weight % or less, or 1.0 weight % or less hydrogen donors, based on a total weight of the FR composite composition.

The FR composite composition may include one or more UV sensitizers. The UV sensitizers may be used to enable long wave length reactions of UV systems with photoinitiators that typically absorb at lower wavelengths. For example, UV sensitizers may be used with cationic photoinitiators with absorption limited to wavelengths of about 355 nm. UV sensitizers may interact with UV light at higher wavelengths, for example in the 400 nm range, and then interact with a photoinitiator to create either free radicals or Brønsted acids. While not bound by any particular theory, it is believed that a UV sensitizer forms an excited triplet state under UV light absorption, and then, through electron or energy transfer may react with a photoinitiator to generate free radicals and/or Brånsted acids.

The UV sensitizers may include dibutoxyantracene, diethoxyanthracene, 1-chloro-4-propoxythioxanthone, 2 and 4-isopropylthioxanthone.

The FR composite composition may include from about 0.0 weight % to about 10.0 weight % UV sensitizers, based on a total weight of the FR composite composition. For example, the FR composite composition may include 10.0 weight % or less, 5.0 weight % or less, or 1.0 weight % or less UV sensitizers, based on a total weight of the FR composite composition.

The FR composite composition may include one or more free radical inhibitors or antioxidants. The free radical inhibitor may be added in a sufficient amount to the liquid polymer to inhibit unwanted polymerization of regions outside the desired printing area to allow sufficient resolution to the desired part.

The free radical inhibitors may include hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, nbutylhydroquinone, N-nitorosophenylhydroxylamine aluminium salt, nitrosamine inhibitors, and combinations or mixtures thereof.

The FR composite composition may include from about 0.0 weight % to about 5.0 weight % free radical inhibitors, based on a total weight of the FR composite composition. For example, the FR composite composition may include 5.0 weight % or less, 3.0 weight % or less, or 1.0 weight % or less free radical inhibitors, based on a total weight of the FR composite composition.

The FR composite composition may include one or more thermal initiators. The thermal initiators may generate free radicals under elevated temperature conditions. Different types or combinations of free radical thermal initiators may be used to generate different reaction rates in the polymerizations of the FR composite composition, and may allow for multiple curing mechanisms in FR compositions including both photopolymers and thermosets.

The thermal initiators may include benzoyl peroxide, dicumyl peroxide, 2,2'-azobisisobutyronitrile, and combinations or mixtures thereof.

The FR composite composition may include from about 0.0 weight % to about 10.0 weight % thermal initiators, based on a total weight of the FR composite composition. For example, the FR composite composition may include 10.0 weight % or less, 5.0 weight % or less, or 1.0 weight % or less thermal initiators, based on a total weight of the FR composite composition.

The FR composite composition may include one or more UV absorbers, fluorescents, dyes, and/or optical brighteners. The UV absorbers, fluorescents, dyes, and/or optical brighteners may absorb light at a first wavelength and convert the energy either into thermal energy or radiation at a higher wavelength.

The UV absorbers, fluorescents, dyes, and/or optical brighteners may be used to improve a print quality and resolution of a FR composite by containing the curing of the FR composite composition to a region of laser or light exposure to the desired region laterally and vertically in a print bath.

The UV absorbers, fluorescents, dyes, and/or optical brighteners may include 2-(2-hydroxyphenyl)-benzotriazole, 2-hydroxyphenyl-benzophenones, 2-hydroxyphenyl-s-triazines, 2,2'-(2,5-thiophenediyl)bis(5-tertbutylbenzoxazole), 2,2'-(1,2-ethenediyl)bis(4,1-phenylene) bisbenzoxazole, Tartrazine, bixin, and combinations or mixtures thereof.

The FR composite composition may include from about 0.0 weight % to about 10.0 weight % UV absorbers, fluorescents, dyes, and/or optical brighteners, based on a total weight of the FR composite composition. For example, the FR composite composition may include 10.0 weight % or less, 5.0 weight % or less, or 1.0 weight % or less UV absorbers, fluorescents, dyes, and/or optical brighteners, based on a total weight of the FR composite composition.

The FR composite composition may include one or more additional flame retardants. The additional flame retardants may prevent flammability through one or more ways of limiting a fuel supply, such as reducing oxygen and other readily combustible organic materials, releasing water or other inert substances, increasing char formation to create a noncombustible and/or protective layer, reducing temperature through an endothermic reaction, and/or the scavenging of free radicals during a combustion event.

The additional flame retardants may include melamine, cyanurate, phosphate esters, phosphonic acids phosphate, phosphinates, phosphonates and brominated compounds, and combinations or mixtures thereof.

The additional flame retardants may include flame retarding resin components, monomers, oligomers, and polymers. For example, the additional flame retardants may include tri bromophenol, brominated polystyrene, brominated polyacrylate, decabromodiphenyl oxide, decabromodiphenyl ethane; poly-(m-phenylene methylphosphonate), bisphenol A bis(diphenyl phosphate), phosphorus polyols, and combinations and mixtures thereof.

The FR composite composition may include from about 0.0 weight % to about 80.0 weight % additional flame retardants, based on a total weight of the FR composite composition. For example, the FR composite composition may include 80.0 weight % or less, 50.0 weight % or less, 20.0 weight % or less, or 10.0 weight % or less additional flame retardants, based on a total weight of the FR composite composition.

The FR composite composition may include one or more rheology modifiers. The rheology modifiers may facilitate controlling a flow behavior of the liquid polymer or photopolymers.

The rheology modifiers may include monomers, oligomers, and polymers that can be polar, non-polar, protic and aprotic. For example, the rheology modifiers may include hydrophobically modified polyurethanes and polyethers.

The rheology modifiers may include solvents, such as cyclic and aliphatic organic solvents. For example, the rheology modifiers may include alcohols, hydrocarbons, propylene carbonate, ketones, ethyl acetate, and methoxypropanol.

The FR composite composition may include from about 0.0 weight % to about 10.0 weight % rheology modifiers, based on a total weight of the FR composite composition. For example, the FR composite composition may include 10.0 weight % or less, 5.0 weight % or less, or 1.0 weight % or less rheology modifiers, based on a total weight of the FR composite composition.

The FR composite composition may include one or more dispersion agents or additives. The dispersion agents may improve a uniform suspension of the solid filler in the FR composite composition. For example, the FR composite composition may include dispersion agents to enhance the compatibility of the solid filler with the liquid polymer, the dispersion agents may enhance the solubility, wetting, and/or dispersion of the solid filler in the liquid polymer, as well as the bonding between the solid filler and the liquid resin. In some implementations, the dispersion agents may be chosen to match an isoelectric point of the solid filler particles with a chemistry and functionality of the liquid polymer.

The dispersion agents may be added to the liquid polymer and/or to the solid filler prior to mixing with the liquid polymer.

The FR composite composition may include from about 0.0 weight % to about 10.0 weight % dispersion agents, based on a total weight of the FR composite composition. For example, the FR composite composition may include 10.0 weight % or less, 5.0 weight % or less, or 1.0 weight % or less dispersion agents, based on a total weight of the FR composite composition.

The FR composite composition may have an orthogonal reactive functionality. For example, the photopolymer may be configured to intertwine with the FR thermoset when the photopolymer and the FR thermoset are separately cross-linked. In some implementations, the FR composite composition may have two different functional or reactive mechanisms. For example, while acylate will not react with a phenolic resin, they may react independently and form interpenetrating networks.

In some implementations, the crosslinked photopolymer does not chemically react with the crosslinked FR thermoset. For example, the properties of the photopolymer and the FR thermoset are separately preserved even if intertwined.

In some implementations, the FR composite composition excludes ingredients that would be a toxicity concern. For example, in one implementation, the FR composite composition does not include halogens.

As described above, the FR composite composition of the present disclosure is designed for creating composite structures with desirable FR properties.

UL-94 ("Standard for Safety of Flammability of Plastic Materials for Parts in Devices and Appliances testing") is a set of plastics flammability tests and criteria released by Underwriters Laboratories (UL) of the United States. The Underwriter Laboratories standard UL-94 ("UL-94") standard may be used to classify materials into categories according to their flammability characteristics. For example, as illustrated in Table 1, a composite structure may be classified as under one of six categories, starting with the least flammable (HB) to the most flammable (5VB), according to the UL-94 criteria satisfied during testing. Testing usually involves applying an open flame to a vertically or horizontally mounted specimen made of the material to be tested.

TABLE 1

UL-94 Flammability rating

| Rating | Sample Criteria |
|---|---|
| HB | slow burning on a horizontal specimen; requires a burning rate ≤75 mm/min for thickness <3 mm, a burning rate ≤40 mm/min for thickness between 3-13 mm, or extinction of the flame before 1$^{st}$ reference mark. |
| V-0 | burning on a vertical specimen; requires a burning time of 10 sec. or less after flame application; dripping of burning specimens is not allowed. |
| V-1 | burning on a vertical specimen; requires a burning time of 30 sec. or less after flame application; dripping of burning specimens is not allowed. |
| V-2 | burning on a vertical specimen; requires a burning time of 30 sec. or less after flame application; dripping of burning specimens is allowed. |
| 5VA | burning on a vertical specimen, requires a burning time of 60 sec. or less on a vertical specimen; dripping of burning specimens is not allowed; specimens may not develop a hole. |
| 5VB | burning on a vertical specimen, requires a burning time of 60 sec. or less on a vertical specimen; dripping of burning specimens is not allowed; specimens may develop a hole. |

According to the present disclosure, the FR composite composition may have a UL-94 rating of V-0. In other implementations, the FR composite composition may have a UL-94 rating of V-1 or V-2. In some implementations, the FR composite composition has a UL-94 rating of V-0 or better, V-1 or better, or V-2 or better.

The heat release rate of a material is another important factor to determine the fire hazard or flammability of a material. A microscale combustion calorimeter (MCC) may be used to measure a heat release rate (HRR) a peak HRR, and a total heat release (THR) of a sample. MCC measurements may be made according to established standards, such as ASTM D7309. Generally, a material having a low peak HRR is indicative of a slow burning material, and a material having a low THR is indicative of a material with low flammability.

According to the present disclosure, the FR composite composition may have a THR of about 12 KJ/g or less. In other implementations, the FR composite composition may have a THR of about 10 KJ/g or less or a THR of about 8 KJ/g or less.

In some implementations, the FR composite composition has a UL-94 rating of V-2 or better and a THR of about 12 KJ/g or less. For example, the FR composite composition may have a UL-94 rating of V-0 or better and a THR of about 8 KJ/g or less.

In other implementations, the FR composite composition may have a peak HRR during 5 minutes of less than 65 kW/m$^2$ and a THR at 2 minutes of less than about 65 kW min/m$^2$.

Generally, char is defined as the solid material that remains after light and/or volatile gasses have been driven out or released after combustion or pyrolysis. Char yield may be measured by thermal gravitational analysis (TGA) and/or MCC, whereby the mass of a milligram sized sample is measured as a function of a temperature ramp in a given atmosphere. For example, a char yield may be obtained by weight samples of the FR composite composition before and after heating it to 400 C or greater in an inert atmosphere.

A higher char yield signifies that less material volatilized in the combustion event. If the gases evolved during combustion are toxic, a higher char yield would indicate lower toxicity. High char yield is also correlated better flammability performance, as typically less material thermally reacted with a concomitant release of heat.

Accordingly, in some implementations, the resulting FR composite may have a char yield of 30.0% or greater. For example, the FR composite may have a char yield of 50.0% or greater or 60.0% or greater.

The FR composite composition may be used to create an FR composite structure using a variety of 3D printing or additive manufacturing methods. For example, the FR composite composition may be configured for printing into an FR composite by a light-based additive process. Suitable light-based additive process may include a stereo lithography (SLA) process, a material jetting (MJ) process, and a self-propagating waveguide (SPPW) process. The additive manufacturing method may include a thermal post-treatment curing step to lock in at least one of the photopolymer or the FR thermoset.

A general method for making an FR composite may include printing an uncured FR composite using a FR composite composition in a light-based additive manufacturing process, light curing the uncured FR composite, and thermally curing the FR composite.

For example, in an SLA process, the FR composite composition may be contained in a bath, and layers of the FR composite composition may be cured into an FR composite structure using UV laser rastering, digital light projection (DLP), liquid crystal display projection (LCDP), or light projection-microstereolithography. The FR composite composition may be subject to thermal curing during the SLA process and/or after the SLA process to crosslink the FR thermoset into the FR composite structure. For example, in a light based stereo lithography 3D printing process, the FR composite composition may be polymerized when exposed to light in layers of patterns that render a 3D structure upon completion.

In a polymer jetting process, the FR composite composition may be deposited or sprayed by a nozzle and written into a desired pattern. As the FR composite composition is dispensed, it may be exposed to UV light, such as a laser, LED, or plasma sources, and cured into an FR composite structure. In some implementations, the FR composite composition may be subject to thermal curing and/or heat during the polymer jetting process and/or after the polymer jetting process to crosslink the FR thermoset into the FR composite structure.

The FR composite composition may be configured for printing into an FR composite structure via a self-propagating waveguide (SPPW) process. An example of an SPPW process is described in U.S. Pat. No. 10,407,550, and is herein incorporated by reference in its entirety.

In an SPPW process, a volume of the FR composite composition may be formed, and a mask may be placed between a collimated light source and the volume of the FR composite composition. Optical waveguides are then formed by directing a collimated light beam through the mask into the volume of the FR composite composition to form the FR composite structure. When exposed to light through the apertures a polymerization front is initiated. As the polymerization occurs it propagates along the light path creating a 3-dimensional structure from arrays of optical waveguides intersection. The resulting polymer microlattice is comprised of the FR composite. A second thermal curing can be performed to cross link the thermosets.

Accordingly, the FR composite composition may be configured to form a plurality of self-propagating polymer optical waveguides. For example, the FR composite composition may be configured to form a microlattice structure. Struts of the microlattice structure may include FR materials and/or struts of the microlattice structure may entrain FR materials. The FR materials included or entrained by the struts of the microlattice structure may include the solid filler.

The tensile strength of the FR composite was measured following ASTM D638. The FR composite formed from the FR composite composition may have a tensile strength from about 6 to about 12 ksi. For example, the FR composite may have a tensile strength of about 12 ksi or less, about 10 ksi or less, or about 8 ksi or less.

EXAMPLES

Aspects of the present disclosure can be further understood by referring to the following examples. The examples are illustrative, and are not intended to be limiting.

Tables 2-3 illustrates FR composite composition according to implementations of the present disclosure.

TABLE 2

FR Composite Composition 1

| Ingredient | Weight % |
|---|---|
| Solid Filler (Fumed Silica) | 35 weight % |
| Liquid Polymer<br>(25 weight % Phenolic Resins)<br>(34 weight % tris (2-hydroxyethyl) isocyanurate triacrylate)<br>(34 weight % Bis[2-(methacryloyloxy)ethyl] phosphate)<br>(7 weight % Pentaerythritol tetrakis(3-mercaptopropionate)<br>(0.1 weight % photo initiator) | 65 weight % |

TABLE 3

FR Composite Composition 2

| Ingredient | Weight % |
|---|---|
| Solid Filler (Fumed Silica) | 35 weight % |
| Liquid Polymer<br>(25 weight % Phenolic Resins)<br>(68 weight % bis[2-(methacryloyloxy)ethyl] phosphate)<br>(7 weight % pentaerythritol tetrakis(3-mercaptopropionate)<br>(0.1 weight % photo initiator) | 65 weight % |

TABLE 4

FR Composite Composition 3

| Ingredient | Weight % |
|---|---|
| Solid Filler | 0.0 weight % |
| Liquid Polymer<br>(75 weight % Phenolic Resins)<br>(25 weight % bis[2-<br>(methacryloyloxy)ethyl] phosphate)<br>(0.1 weight % photo initiator) | 100.0 weight % |

The FR composite compositions of Tables 2-4 were created as follows: 1000 g of a liquid resin mixture was prepared using the listed ingredients amounts for the liquid polymer described in Table 2-4. The liquid resin mixture was then stirred at 75° C. and 1 atm for 1 hour using a high shear overhead mixer. For FR Composite Composition 3 (Table 4), the liquid resin mixture was vacuumed at 30 mmHg for an hour or until no bubbles were observed. For FR Composite Compositions 1-2 (Tables 2-3), the solid fillers amounts were added to the mixture in a total of five portions, 108 g per portion, with vigorous mixing in between. Upon completion of the solid filler addition, the mixture was then stirred overnight at 60° C. under a vacuum of 30 mm Torr. The vacuum was applied until there were no bubbles or foaming observed.

In order to test the FR characteristics of the FR composite compositions of Tables 2-4, FR composite structures were created as follows: A Delrin reservoir (9"×9"×¼" in [width× length×height]), was filled with the FR composite compositions of Tables 2-4 and covered with a patterned mask fastened to a flat glass surface. Three broad spectrum collimated light sources at 365-400 nm wavelength were directed at the patterned mask with circular apertures. Upon exposure of light in the appropriate wavelength range, polymerization of the FR composite compositions of Tables 2-4 begins at the point of exposure and propagates along the light path until the termination of the incident light energy. The collimated light beams were arranged at equal angles, 42.5° off the mask surface, and 120° about the mask normal with an energy of 19 mW/cm². The patterned mask had a hexagonal unit cell geometry, 1 mm opening, and 7 mm spacing. The resulting microtruss structures were cleaned off the excessive resins and heat treated at 160° C. for 16 h. The final truss structure was sandwiched between two skins. The skins were painted with the corresponding FR composite compositions of Tables 2-4 that made up the truss and attached to the microtruss by ultra-violet light exposure on one side and heat curing on the other side. A layer of cosmetic skin was fastened by heat shrinking to the microtruss ensemble. The structure was then cut into samples for characterization of flame retarding properties.

Accordingly, FR Composite 1 was created from FR Composite Composition 1, FR Composite 2 was created from FR Composite Composition 2, and FR Composite 3 was created from FR Composite Composition 3.

The UL-94 ratings for FR composites 1-3 were assessed according to the UL-94 standard for a vertical burn test. Full details of the testing method are found in Section 8 of the UL-94 standard. However, a synopsis of the method is given here for illustration purposes only: The test used a rectangular specimen, measuring 7"×0.75"×0.125". The long axis of the test specimen was vertically oriented and a cotton indicator placed below the specimen. The bottom end of the specimen was lit with a MAP torch for 10 seconds. After removal of the flame, the time for the specimen to extinguish was recorded. After extinguishing, the sample was relit for an addition 10 sec. After removal of the flame, the time for the specimen to extinguish a second time was recorded as well as the time for cessation of afterglow. Material flame resistance was classified using the criteria in Table 8.1 of the UL-94 standard, which is similar to Table 1 above (included for illustrative purposes). Ul-94 results for FR composites 1-3 are summarized in Table 5 below, where a V-0 rating is the best possible classification for a tested composite under the UL-94 standard for a vertical burn test.

The flammability for FR composites 1-3 was assessed via microscale combustion calorimetry (MCC) as follows: a 10 mg sample of each FR composite was placed inside of a chamber with a nitrogen and oxygen gas (4:1 ratio) overflow. The temperature within the chamber was increased at 1° C./second up to 1000° C. to volatize combustible components from the sample. The volatized gases were introduced into an oxygen rich gas stream and combusted. Heat release from the combustion was calculated from the oxygen consumption history. Two key metrics extracted from this testing were the total heat released (THR) and the heat release coefficient (HRC), which is defined as the maximum heat release rate. In addition, the char yield was calculated as the mass fraction remaining after the high temperature volatilization experiment. Results for the THR, HRC, and Char Yield for FR composites 1-3 are summarized in Table 5.

Table 5 illustrates the FR properties for FR composites 1-3.

TABLE 5

| | FR Composite 1 | FR Composite 2 | FR Composite 3 |
|---|---|---|---|
| UL-94 | V-0 | V-0 | V-0 |
| THR | 7.1 KJ/g | 6.5 KJ/g | 10 KJ/g |
| HRC | 71.4 J/gK | 41.9 J/gK | 74 J/gK |
| Char Yield | 57.1% | 61.8% | 48% |

As illustrated in Table 5, the FR composites created from FR composite compositions according to implementations of the present invention displayed desirable FR properties while still being capable of being created via light-based additive manufacturing.

What is claimed, is:

1. A fire retardant (FR) composite composition, comprising:
    from about 15.0 weight % to about 99.9 weight % of a liquid polymer, based on a total weight of the FR composite composition,
    wherein the liquid polymer comprises:
        from about 10.0 weight % to about 90.0 weight % of a photopolymer comprising at least two of a first molecule, a second molecule, and a third molecule, based on a total weight of the liquid polymer,
        from about 15.0 weight % to about 80.0 weight % of a FR thermoset, based on the total weight of the liquid polymer, and
        from about 0.001 weight % to about 10 weight % of a photoinitiator, based on the total weight of the liquid polymer, and
    wherein the first molecule comprises one or more unsaturated carbon-carbon double bonds or triple bonds,
    wherein the second molecule comprises a terminal thiol group, and
    wherein the third molecule comprises one or more functional groups selected from the group consisting of an aliphatic ether, a cyclic ether, a vinyl ether, an epoxy, a cyclo aliphatic epoxy, an oxetane, an isocyanate, and a diisocyanate group.

2. The FR composite composition of claim 1, wherein the FR thermoset comprises at least one of resole phenolics, novolac phenolics, cyanate esters, melamines, polycyanurates, and mixtures and combinations thereof.

3. The FR composite composition of claim 1, wherein the photoinitiator comprises at least one of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, thioxanones, and mixtures and combinations thereof.

4. The FR composite composition of claim 1, wherein the FR composite composition has an UL-94 Rating of V-2 or better.

5. The FR composite composition of claim 1, wherein the FR composite composition has a total heat release (THR) of about 12 KJ/g or less.

6. The FR composite composition of claim 1, wherein the FR composite composition has an UL-94 Rating of V-2 or better and wherein the FR composite composition has a total heat release (THR) of about 12 KJ/g or less.

7. The FR composite composition of claim 1, wherein the photopolymer comprises from about 5.0 weight % to about 90 weight % of the first molecule, based on a total weight of the photopolymer.

8. The FR composite composition of claim 7, wherein the first molecule comprises at least one of tris (2-hydroxyethyl) isocyanurate triacrylate, 1,3,5-trivinyl-1,3,5-trimethylcyclosiloxane, 1,3,5,7-tetravinyl-1,3,5,7 tetra methylcyclo tetrasiloxane, vinylmethylsiloxane-dimethylsiloxane copolymer, 1,3,5-triallyl-1,3,5-triazine-2,4,6(1H,3H,5H)-trione, bis[2-(methacryloyloxy)ethyl] phosphate, bisphenol A epoxy diacrylate, (acryloxypropyl)methylsiloxane, pentaerythritol tetraacrylate, pentaerythritol triacrylate, trimethylolpropane triacrylate, ethylene, substituted olefins, halogenated olefins, 1,3-dienes, styrene, x-methyl styrene, vinyl esters, acrylonitriles, acrylamides, N-vinyl carbazole, N-vinyl pyrolidone, monoacrylates, diacrylates, triacrylates, tetraacrylates, pentaacrylates, monomethacrylates, dimethacrylates, trimethacrylates, tetramethacrylates, pentamethacrylates, pentabromobenzyl acrylate, pentabromobenzyl methacrylate, 2-isocyanatoethyl acrylate, 2-isocyanatoethyl methacrylate, and mixtures and combinations thereof.

9. The FR composite composition of claim 1, wherein the photopolymer comprises from about 1.0 weight % to about 90 weight % of the second molecule, based on a total weight of the photopolymer.

10. The FR composite composition of claim 9, wherein the second molecule comprises at least one of 1,4-butanedithiol, benzene-1,4-dithiol, biphenyl-4,4-dithiol, 4,4'-thiobis-benzenethiol, pentaerythritol tetrakis(3-mercaptopropionate), trimethylolpropanetris(2-mercaptoacetate), trimethylolpropane tris(3-mercaptopropionate), tetrakis(dimethyl-2-mercaptoacetate siloxy)silane, (mercaptopropyl)methylsiloxane-dimethylsiloxane copolymer, (mercaptopropyl)methylsiloxane homopolymer, and pentaerythritol tetrakis(2-mercaptoacetate), ethylene glycol bis(3-mercaptopropionate), 1,4-butanediol bis(thioglycolate), 2-[2,4-bis(2-mercaptoethyl) cyclohexyl]ethanethiol, 2-[3,5-bis(2-mercaptoethyl)cyclohexyl]ethanethiol and mixtures and combinations thereof.

11. The FR composite composition of claim 1, wherein the photopolymer comprises from about 1.0 weight % to about 80.0 weight % of the third molecule, based on a total weight of the photopolymer.

12. The FR composite composition of claim 11, wherein the third molecule comprises at least one of epoxy functional dimethylpolysiloxane, (epoxycyclohexylethyl)methylsiloxane-dimethylsiloxane copolymer, bis (3,4-epoxycyclohexylmethyl) adipate, 3,4-epoxycyclohexylmethyl-3',4'-epoxycyclohexane carboxylate, 3-ethyl-3-hydroxymethyl oxetane, and mixtures and combinations thereof.

13. The FR composite composition of claim 1, further comprising:
    from about 15.0 weight % to about 80.0 weight % of a solid filler,
    wherein the solid filler comprises at least one of an inert, a nonflammable, and a flame retarding material.

14. The FR composite composition of claim 13, wherein the solid filler has an average particle size from about 5 nm to about 100 micrometers.

15. The FR composite composition of claim 13, wherein the solid filler comprises at least one of silica, alumina trihydrate, ammonium polyphosphate, red phosphorous, organic phosphinate, melamine polyphosphate, borates, expandable graphite, and mixtures and combinations thereof.

16. The FR composite composition of claim 1, wherein the FR composite composition is configured to create an FR composite by a light-based additive process.

17. The FR composite composition of claim 16, wherein the light-based additive process comprises a self-propagating waveguide (SPPW) process, and
    wherein the FR composite composition is configured to form a plurality of self-propagating polymer optical waveguides.

18. The FR composite composition of claim 16, wherein the light-based additive process comprises a light based stereo lithography 3D printing process, and
    wherein the FR composite composition is polymerized when exposed to light in layers of patterns that render a 3D structure upon completion.

19. An FR composite created from an FR composite composition according to claim 1.

* * * * *